United States Patent
Kim et al.

(10) Patent No.: US 10,840,955 B2
(45) Date of Patent: Nov. 17, 2020

(54) METHOD AND APPARATUS FOR CANCELLING INTERFERENCE SIGNAL IN WIRELESS COMMUNICATION SYSTEM

(71) Applicant: Samsung Electronics Co., Ltd., Suwon-si (KR)

(72) Inventors: Taeyoon Kim, Seongnam-si (KR); Jonghan Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 14/331,682

(22) Filed: Jul. 15, 2014

(65) Prior Publication Data

US 2015/0018001 A1    Jan. 15, 2015

Related U.S. Application Data

(60) Provisional application No. 61/846,298, filed on Jul. 15, 2013.

(30) Foreign Application Priority Data

Jan. 3, 2014    (KR) .................. 10-2014-0000538

(51) Int. Cl.
*H04B 1/10* (2006.01)
*H04W 72/08* (2009.01)
(Continued)

(52) U.S. Cl.
CPC ........ *H04B 1/1027* (2013.01); *H04W 72/082* (2013.01); *H04B 2001/1045* (2013.01); *H04W 72/042* (2013.01); *H04W 76/14* (2018.02)

(58) Field of Classification Search
CPC . H04W 76/023; H04W 72/082; H04W 92/18; H04W 72/042; H04W 28/04; H04L 1/0002
See application file for complete search history.

(56) References Cited

U.S. PATENT DOCUMENTS

2006/0245398 A1* 11/2006 Li .................. H04B 7/2668
                                            370/335
2010/0240312 A1    9/2010 Peng et al.
(Continued)

FOREIGN PATENT DOCUMENTS

CN      1768547 A      5/2006
CN    102647749 A      8/2012
(Continued)

OTHER PUBLICATIONS

61818465 Translated Specification (Year: 2013).*
(Continued)

*Primary Examiner* — Ernest G Tacsik
(74) *Attorney, Agent, or Firm* — Jefferson IP Law, LLP (57) ABSTRACT

An interference cancellation method and apparatus for use in the wireless communication system is provided. The interference cancellation method of a Device-to-Device (D2D) terminal in a wireless communication system includes receiving interference signal information for use in cancelling a cellular interference signal acting as interference to the D2D terminal from a base station, cancelling the cellular interference signal from a received signal based on the interference signal information, and processing a D2D signal transmitted to the D2D terminal.

10 Claims, 10 Drawing Sheets

(51) Int. Cl.
*H04W 76/14* (2018.01)
*H04W 72/04* (2009.01)

(56) References Cited

U.S. PATENT DOCUMENTS

| | | | |
|---|---|---|---|
| 2010/0255852 A1* | 10/2010 | Chen | H04W 72/082 |
| | | | 455/450 |
| 2010/0261469 A1 | 10/2010 | Ribeiro et al. | |
| 2011/0300892 A1* | 12/2011 | Hakola | H04W 72/085 |
| | | | 455/512 |
| 2012/0028672 A1* | 2/2012 | Chen | H04W 52/241 |
| | | | 455/522 |
| 2012/0044815 A1* | 2/2012 | Geirhofer | H04W 8/005 |
| | | | 370/248 |
| 2012/0099536 A1* | 4/2012 | Lee | H04L 5/005 |
| | | | 370/328 |
| 2012/0129540 A1* | 5/2012 | Hakola | H04W 72/042 |
| | | | 455/450 |
| 2013/0016666 A1 | 1/2013 | Chen et al. | |
| 2013/0077578 A1 | 3/2013 | Wang et al. | |
| 2013/0128858 A1 | 5/2013 | Zou et al. | |
| 2013/0148637 A1 | 6/2013 | Yang et al. | |
| 2013/0150051 A1 | 6/2013 | Van Phan et al. | |
| 2013/0170387 A1 | 7/2013 | Wang et al. | |
| 2013/0295976 A1* | 11/2013 | Patil | H04W 24/10 |
| | | | 455/501 |
| 2014/0098719 A1* | 4/2014 | Kim | H04W 4/70 |
| | | | 370/280 |
| 2014/0112263 A1 | 4/2014 | Lee et al. | |
| 2014/0185529 A1 | 7/2014 | Lim et al. | |
| 2015/0139004 A1* | 5/2015 | Fodor | H04W 72/082 |
| | | | 370/252 |
| 2016/0080094 A1* | 3/2016 | Kim | H04L 5/001 |
| | | | 455/63.1 |

FOREIGN PATENT DOCUMENTS

| | | |
|---|---|---|
| CN | 102804657 A | 11/2012 |
| CN | 103039103 A | 4/2013 |
| CN | 103068049 A | 4/2013 |
| KR | 10-2013-0065002 A | 6/2013 |
| WO | 2012/124923 A2 | 9/2012 |
| WO | 2013/032251 A2 | 3/2013 |

OTHER PUBLICATIONS

Chinese Office Action dated Jul. 3, 2018, issued in the Chinese Application No. 201480040470.9.

Chinese National Intellectual Property Administration Office Action dated Feb. 19, 2019, issued in Chinese Application No. 201480040470.9.

A Notification of a Decision to Grant dated Aug. 28, 2020, issued in a counterpart Korean Application No. 10-2014-0000538.

* cited by examiner

METHOD AND APPARATUS FOR CANCELLING INTERFERENCE SIGNAL IN WIRELESS COMMUNICATION SYSTEM

CROSS-REFERENCE TO RELATED APPLICATION(S)

This application claims the benefit under 35 U.S.C. § 119(e) of a U.S. Provisional application filed on Jul. 15, 2013 in the U.S. Patent and Trademark Office and assigned Ser. No. 61/846,298, and under 35 U.S.C. § 119(a) of a Korean patent application filed on Jan. 3, 2014 in the Korean Intellectual Property Office and assigned Serial number 10-2014-0000538, the entire disclosure of each of which is hereby incorporated by reference.

TECHNICAL FIELD

The present disclosure relates to a wireless communication system. More particularly, the present disclosure relates to an interference cancellation method and apparatus for use in the wireless communication system.

BACKGROUND

Mobile communication systems provide subscribers with wireless voice communication services. With the rapid advance of technology, the mobile communication systems have evolved to support high speed data communication services as well as the standard voice communication services. However, the limited resources and user requirements for higher speed services in the current mobile communication system spur development of more advanced mobile communication systems.

Device-to-Device (D2D) communication may be implemented in association with a cellular network on the cellular communication band as being discussed currently in $3^{rd}$ Generation Partnership Project (3GPP) as well as a system operating on unlicensed bands.

Recently, D2D communication on Long-Term Evolution (LTE) is discussed in the 3GPP LTE standard. In the D2D communication on LTE, however, the cellular network signals transmitted at a high power level are likely to cause strong interference with the D2D communication terminals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for cancelling interference signal in a wireless communication system supporting Device-to-Device (D2D) communication.

Aspects of the present disclosure provide a method and apparatus for canceling the cellular communication signal acting as interference to the D2D communication terminal operating on the same frequency band as the cellular communication.

In accordance with an aspect of the present disclosure, an interference cancellation method of a D2D terminal in a wireless communication system is provided. The interference calculation method includes receiving interference signal information for use in cancelling a cellular interference signal acting as interference to the D2D terminal, cancelling the cellular interference signal from a received signal based on the interference signal information, and processing a D2D signal transmitted to the D2D terminal.

In accordance with another aspect of the present disclosure, an interference control method of a base station in a wireless communication system is provided. The interference control method includes checking a cellular terminal incurring interference to a D2D terminal, generating interference signal information for use in cancelling a cellular interference signal caused by the cellular terminal, and transmitting the interference signal information to the D2D terminal.

In accordance with another aspect of the present disclosure, a terminal operating in D2D communication mode in a wireless communication system is provided. The terminal includes a transceiver configured to transmit and receive signals to and from a base station and a control unit configured to control receiving interference signal information for use in cancelling a cellular interference signal acting as interference to the D2D terminal, to cancel the cellular interference signal from a received signal based on the interference signal information, and to process a D2D signal transmitted to the D2D terminal.

In accordance with still another aspect of the present disclosure, a base station configured to control interference in a wireless communication system is provided. The base station includes a transceiver configured to transmit and receive signals to and from a terminal and a control unit configured to control checking a cellular terminal incurring interference to a D2D terminal, to generate interference signal information for use in cancelling a cellular interference signal caused by the cellular terminal, and to transmit the interference signal information to the D2D terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Technical details well-known in the art and not related directly to the present disclosure are omitted herein in order to omit unnecessary description and make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

A description is made of the interference cancellation method for efficient Device-to-Device (D2D) communication using the resource of a wireless (cellular) communication system.

In the case of the D2D communication on the frequency band of the cellular communication system, the signal of the cellular network causes interference to the D2D communication. The interference is described below with reference to FIGS. 1 and 2.

Figure 1:
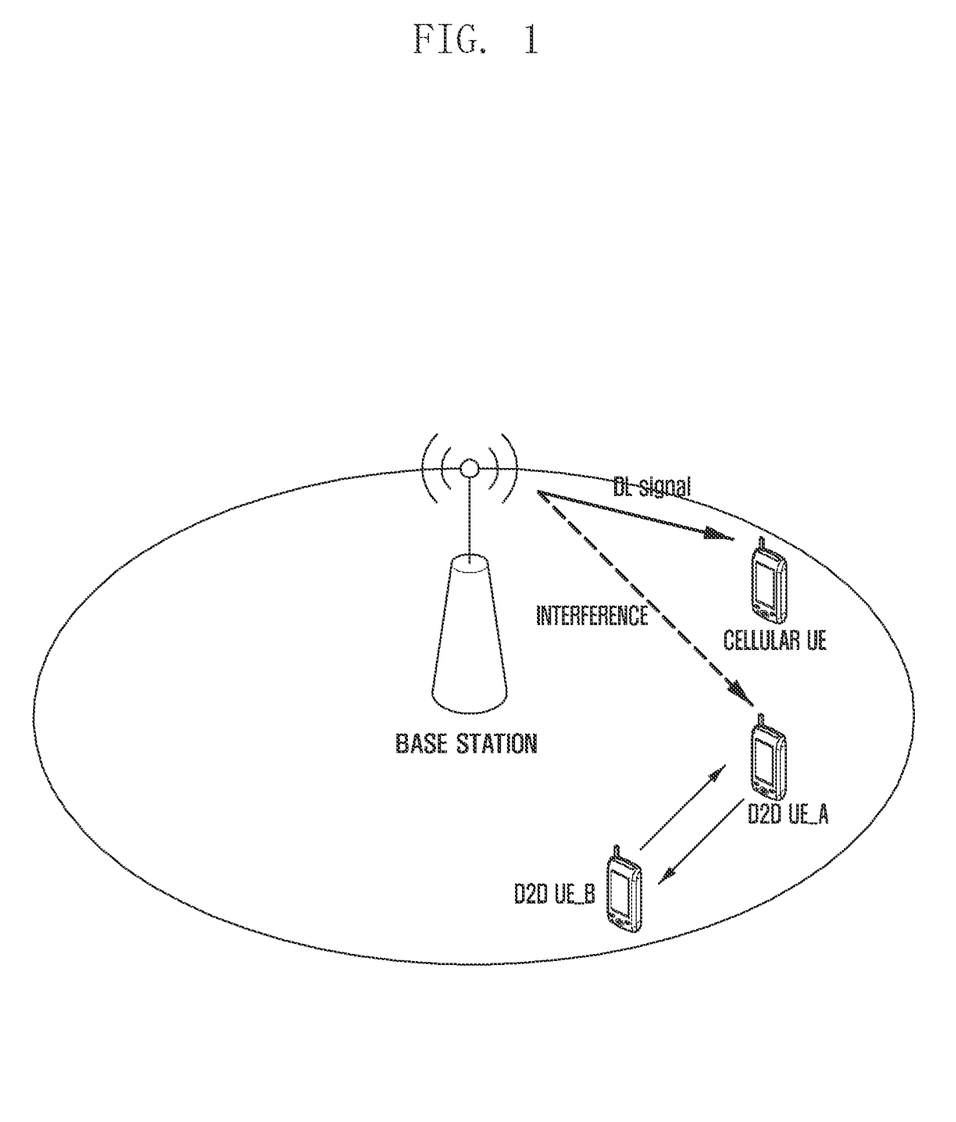
FIG. 1 is a schematic diagram illustrating a situation where a cellular downlink signal causes interference with Device-to-Device (D2D) communication according to an embodiment of the present disclosure.
Figure 2:
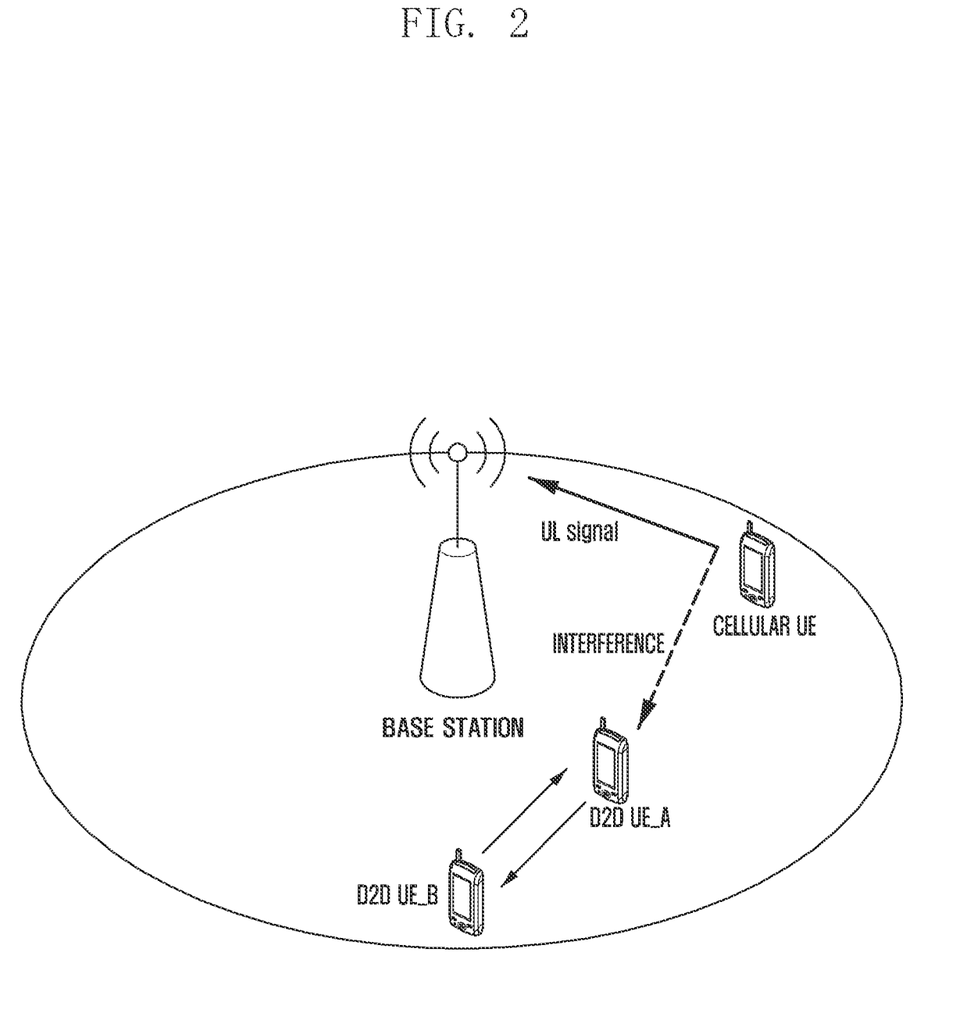
FIG. 2 is a schematic diagram illustrating a situation where a cellular uplink signal causes interference with D2D communication according to an embodiment of the present disclosure.

FIG. 1 is a schematic diagram illustrating a situation where a cellular downlink signal causes interference with D2D communication according to an embodiment of the present disclosure. FIG. 2 is a schematic diagram illustrating a situation where cellular uplink signal causes interference with D2D communication according to an embodiment of the present disclosure.

Referring to FIGS. 1 and 2, depending on the frequency use of the D2D terminal, the cellular downlink or uplink signal may cause interference to the D2D communication. In order to mitigate such interferences, a method as depicted in FIG. 3 may be used.

Figure 3:
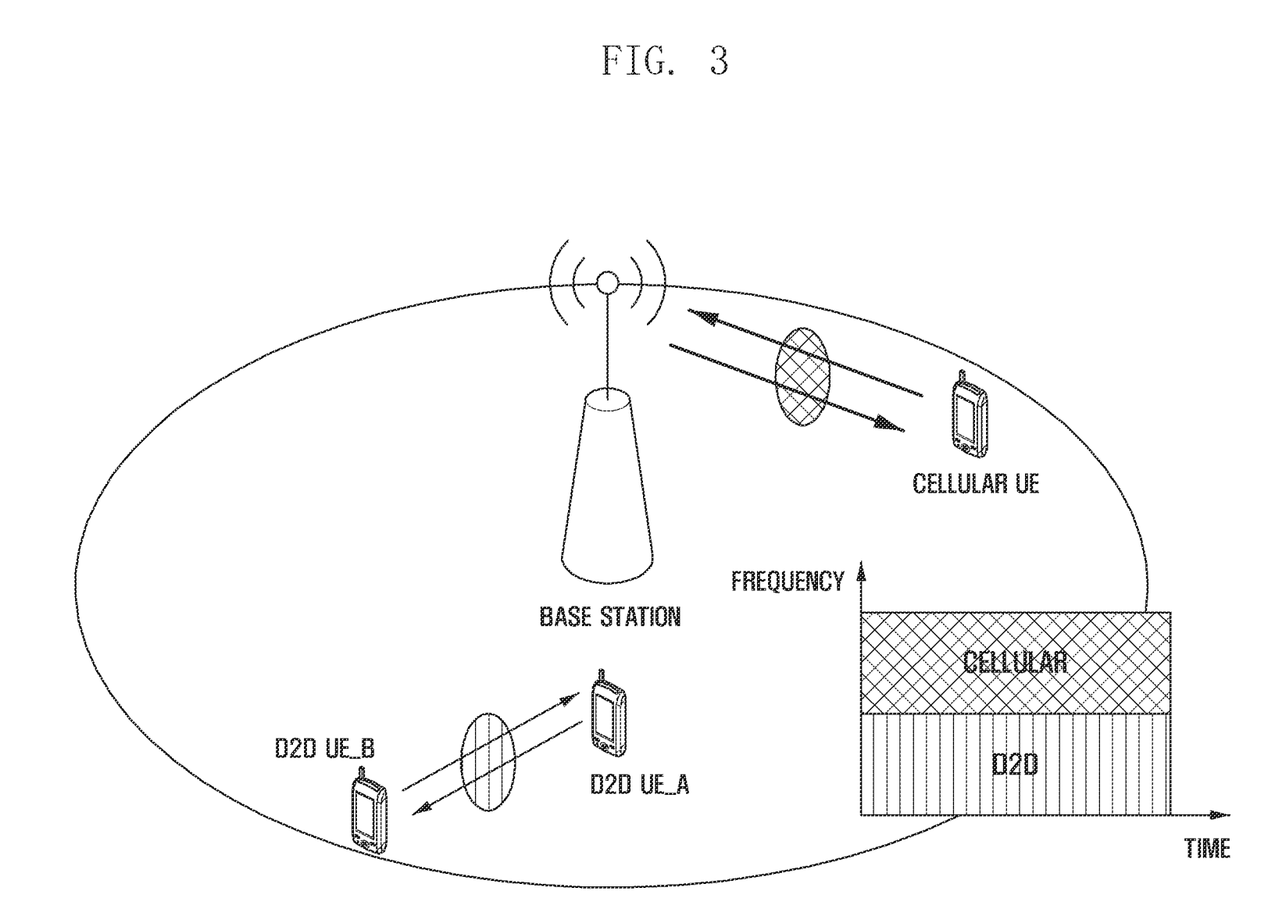
FIG. 3 is a schematic diagram illustrating a radio resource allocation method for suppressing a cellular signal in D2D communication according to an embodiment of the present disclosure.

FIG. 3 is a schematic diagram illustrating a radio resource allocation method for suppressing the cellular signal in D2D communication according to an embodiment of the present disclosure.

Referring to FIG. 3, it can be considered to allocate resources for D2D communication terminal and cellular communication terminal independently to guarantee the signal quality of the D2D communication.

As shown in FIG. 3, the D2D terminal and the cellular terminal are allocated resources independently such that it is possible to guarantee the D2D signal quality. Even in this case, however, a D2D terminal located at the sector boundary or cell edge is exposed to interference from the neighbor cell or sector.

The independent resource allocation for cellular and D2D communications decreases radio resource utilization efficiency, resulting in degradation of system throughput.

The present disclosure proposes a method for cancelling the cellular network signal acting as interference at the D2D terminal operating on the cellular communication frequency band. The interference cancellation method and apparatus according to an embodiment of the present disclosure is capable of operating D2D communication efficiently so as to increase entire radio resource utilization efficiency of the system.

The interference cancellation method proposed in the present disclosure is described briefly first.

The present disclosure proposes a method for providing the D2D terminal with uplink signal information for use in cancelling cellular uplink signal.

The present disclosure provides a method of acquiring, at the D2D terminal, the uplink signal information for use in cancelling the cellular uplink signal by demodulating Physical Downlink Control Channel (PDCCH).

The present disclosure provides a method of acquiring, at the D2D terminal, the uplink signal information for use in cancelling the cellular uplink signal through blind processing.

The present disclosure provides an interference cancellation method of a D2D terminal that is capable of cancelling interference based on the cellular uplink signal information.

The present disclosure provides a method for transmitting downlink signal information from a base station to a D2D terminal, the downlink signal information being used in cancelling the cellular downlink signal.

The present disclosure provides a method of acquiring, at the D2D terminal, the downlink signal information by demodulating PDCCH, the downlink signal information being used in cancelling the cellular downlink signal.

The present disclosure provides a method of acquiring, at the D2D terminal, the downlink signal information for use in cancelling the cellular downlink signal on the same resource through blind processing.

The present disclosure provides an interference cancellation method of a D2D terminal that is capable of canceling interference signal using the acquired cellular downlink signal information.

In order to suppress the cellular communication signal acting as interference to the D2D communication terminal operating on the cellular communication frequency band, four operations are defined in an embodiment of the present disclosure.

Figure 4:
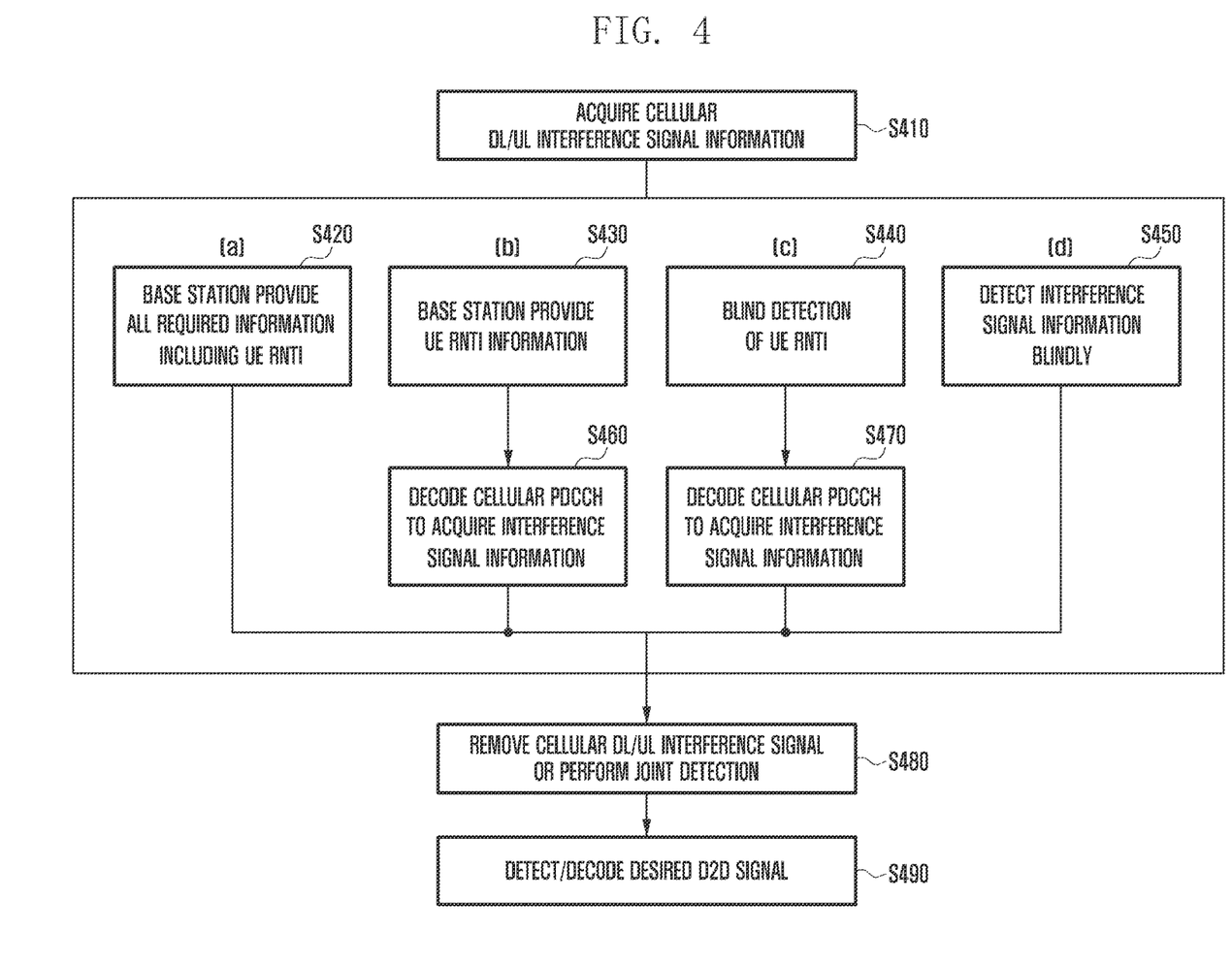
FIG. 4 is a flowchart illustrating an interference cancellation method according to an embodiment of the present disclosure.

FIG. 4 is a flowchart illustrating an interference cancellation method according to an embodiment of the present disclosure.

Referring to FIG. 4, the information required for the interference signal cancellation of the D2D terminal is determined depending on the interference detection and decoding capability.

For example, the symbol level interference signal cancellation based on interference signal detection requires the informations such as signal transmission mode, rank, Precoding Matrix Indicator (PMI), modulation order, and data-to-reference signal power offset.

In the case that the interference signal decoding is further performed, much more information may be required.

A description is made of the case where all interference signal information required for used in interference cancellation is transmitted from the base station to the terminal. The description is made with reference to operation S420 of FIG. 4.

Figure 5A:
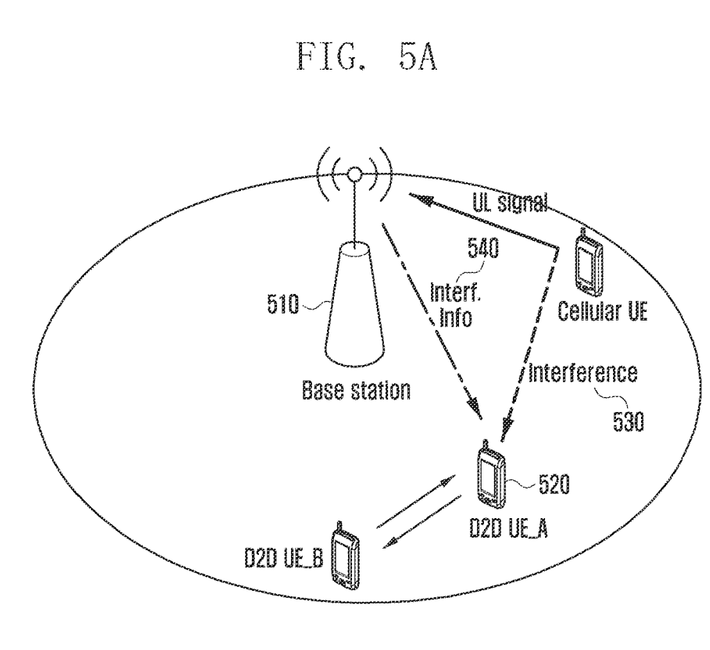
FIGS. 5A and 5B are diagrams illustrating a case where a base station provides a D2D terminal with interference signal information in an interference cancellation method according to an embodiment of the present disclosure.
Figure 5B:
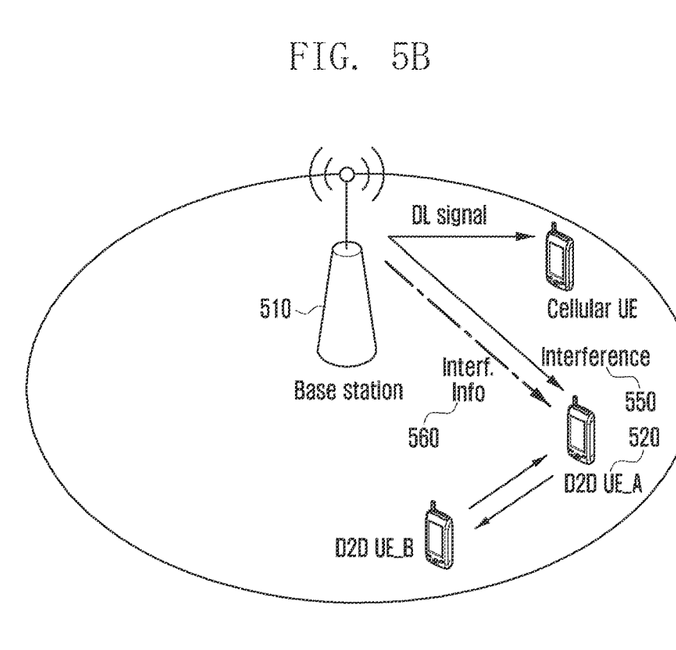

FIGS. 5A and 5B are diagrams illustrating a case where a base station provides a D2D terminal with interference signal information in an interference cancellation method according to an embodiment of the present disclosure.

Referring to FIGS. 5A and 5B, a situation where the cellular uplink signal causes interference to D2D communication is shown.

As shown in FIG. 5A, the base station 510 provides the D2D terminal 520 with the interference signal information 540 for use in cancelling the uplink interference signal 530. The interference signal information 540 may include at least one of interference signal resource allocation information, modulation order, and transmission mode.

The base station may send the D2D terminal the interference signal information through Downlink Control Information (DCI) of PDCCH or higher layer, e.g. Radio Resource Control (RRC) layer, signaling.

Then the D2D terminal may cancel the interference signal using the interference signal information transmitted by the base station.

FIG. 5B shows a situation where the cellular downlink signal causes interference to D2D communication.

As shown in FIG. 5B, the base station provides the D2D terminal 520 with the interference signal information 560 for use in cancelling the downlink interference signal 550. The interference signal information 560 may include at least one of interference signal resource allocation information, modulation order, and transmission mode.

The base station may send the D2D terminal the interference signal information through DCI of PDCCH or higher layer, e.g. RRC layer, signaling.

Then the D2D terminal may suppress the interference signal using the interference signal information transmitted by the base station.

The above procedure is described with reference to operation S420 of FIG. 4.

Referring back to FIG. 4, the base station acquires information necessary for use in cellular downlink or uplink interference signal at the D2D terminal at operation S410.

The base station sends the terminal a terminal identifier at operation S420. The terminal identifier includes Radio Network Temporary Identifier (RNTI) of the terminal. The interference signal information may include at least one of interference signal resource allocation information, modulation order, and transmission mode.

The terminal cancels the cellular downlink or uplink interference signal or performs joint detection at operation S480 based on the interference signal information received from the base station.

The terminal detects and decodes the desired D2D signal at operation S490.

A description is made of the procedure of acquiring the interference signal information in such a way that the D2D terminal performs demodulation on PDCCH transmitted from the base station to the cellular terminals. The description is made with reference to operation S430 of FIG. 4.

Figure 6A:
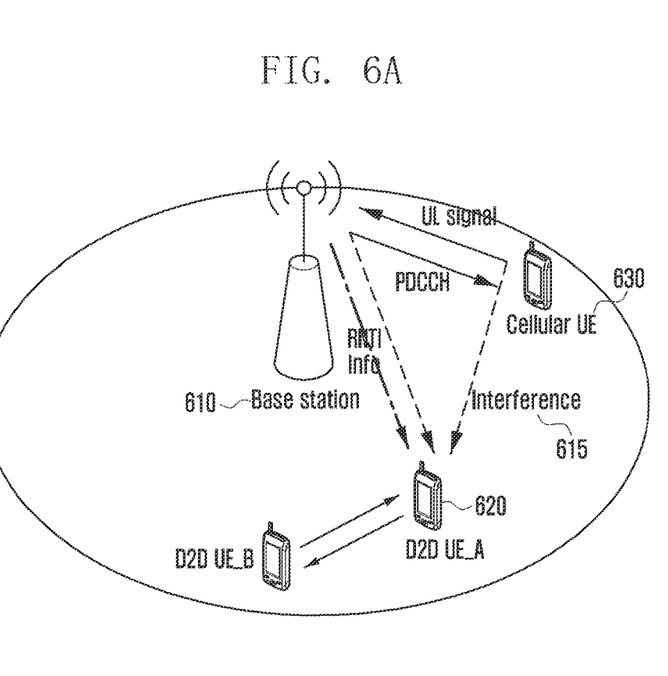
FIGS. 6A and 6B are diagrams illustrating a case where a D2D terminal demodulates a Physical Downlink Control Channel (PDCCH) transmitted from a base station to cellular terminals to acquire interference signal information according to an embodiment of the present disclosure.
Figure 6B:
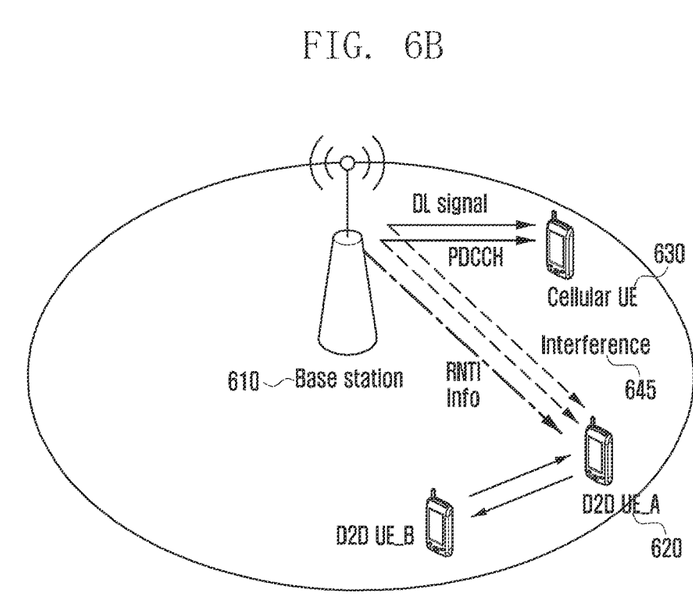

FIGS. 6A and 6B are diagrams illustrating a case where the D2D terminal demodulates PDCCH transmitted from the base station to cellular terminals to acquire the interference signal information according to an embodiment of the present disclosure.

Referring to FIGS. 6A and 6B, FIG. 6A shows a case where the cellular uplink signal causes interference to the D2D communication.

The base station 610 provides the D2D terminal 620 with the terminal identifier (RNTI) of the interferer terminal (cellular terminal) 630 or information on the range of the terminal identifier. Then the D2D terminal 620 modulates PDCCH transmitted by the base station 610 using the received terminal identifier. The D2D terminal 620 is capable of acquiring the uplink interference signal information based on the PDCCH demodulation result.

The D2D terminal is capable of removing the interference signal component 615 using the information acquired by demodulating PDCCH.

As shown in FIG. 6A, the interference signal information may be acquired by demodulating PDCCH in a previous subframe (4 frames before in LTE) carrying the uplink grant (uplink resource allocation information) of the corresponding frame when the cellular uplink signal 615 causes interference to the D2D terminal 620.

FIG. 6B shows a case where the cellular downlink signal causes interference to D2D communication.

The base station 610 provides the D2D terminal 620 with the terminal RNTI of the interferer terminal (cellular terminal) 630 or information on the range of the terminal identifier. Then the D2D terminal 620 modulates PDCCH transmitted by the base station 610 using the received terminal identifier. The D2D terminal 620 is capable of acquiring the downlink interference signal information based on the PDCCH demodulation result.

The D2D terminal 620 removes the interference signal component using the information acquired by demodulating PDCCH.

The above procedure is described with reference to operation S430 of FIG. 4.

Referring back to FIG. 4, the base station first acquires the information necessary for use in cellular downlink or uplink interference cancellation at the D2D terminal at operation S410.

The base station sends the D2D terminal the interference signal information including the terminal identifier at operation S430. The terminal identifier may include RNTI of the terminal.

The D2D terminal performs demodulation and decoding on the PDCCH transmitted to the cellular terminal incurring interference to the D2D terminal at operation S460.

The D2D terminal removes the cellular downlink or uplink interference signal or performs joint detection at operation S480.

The D2D terminal detects and decodes the desired D2D signal at operation S490.

Figure 7A:
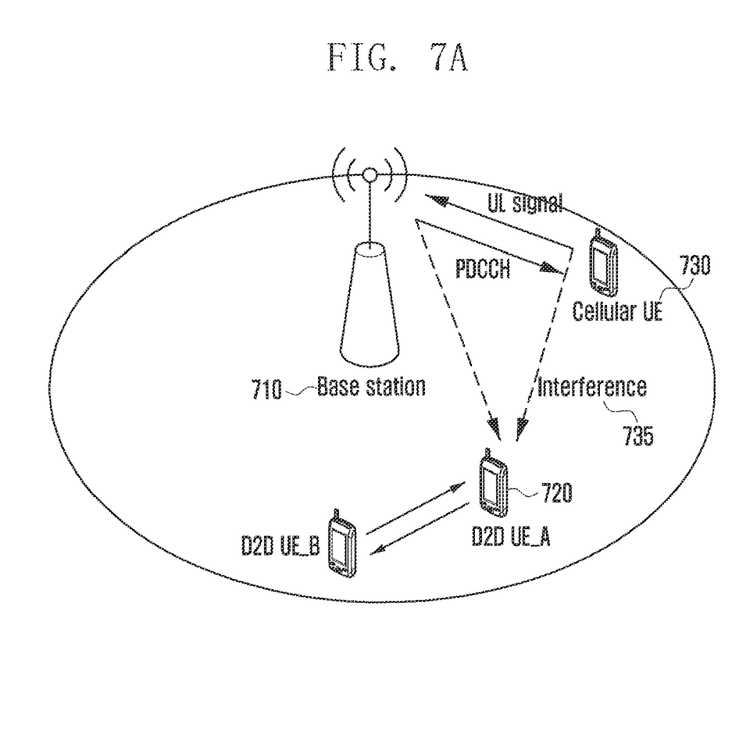
FIGS. 7A and 7B are diagrams illustrating a case where a D2D terminal demodulates PDCCH transmitted from a base station to a cellular terminal to acquire interference signal information according to another embodiment of the present disclosure.
Figure 7B:
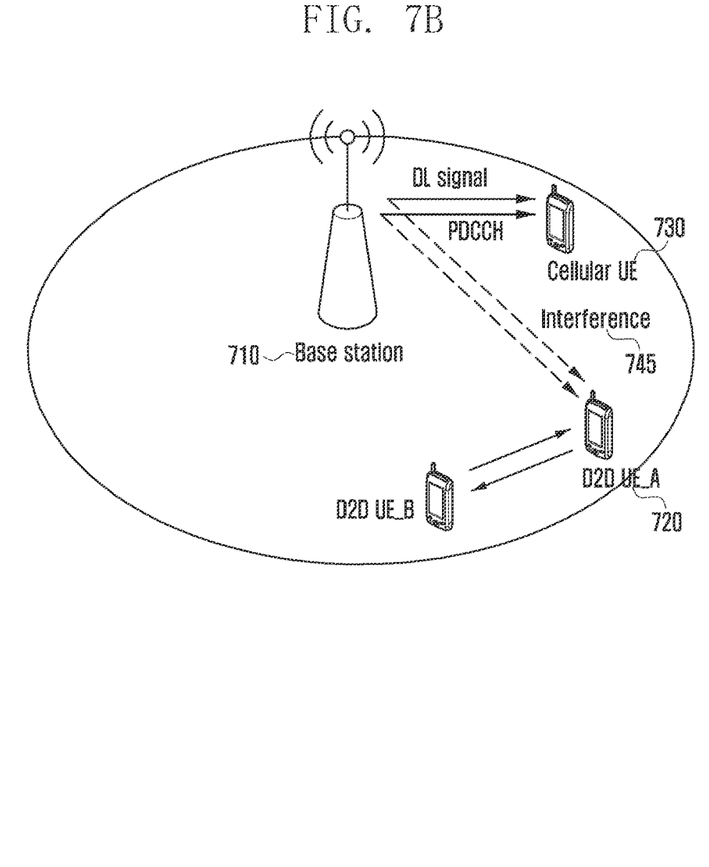

FIGS. 7A and 7B are diagrams illustrating a case where a D2D terminal demodulates PDCCH transmitted from a base station to a cellular terminal to acquire interference signal information according to an embodiment of the present disclosure.

Referring to FIGS. 7A and 7B, the embodiment shown in FIGS. 7A and 7B is directed to a case where the D2D terminal acquires the RNTI of the interferer terminal through blind detection. Unlike the embodiment of FIGS. 6A and 6B where the base station provides the D2D terminal with the identifier of the interferer cellular terminal directly, the embodiment of FIGS. 7A and 7B is directed to the case where the D2D terminal acquires the identifier of the interferer cellular terminal through blind detection.

In order to accomplish this, the D2D terminal 720 performs Cyclic Redundancy Check (CRC) with PDCCH demodulation for all possible cases to determine the valid case as successful blind detection as shown in FIG. 7A.

The D2D terminal demodulates PDCCH transmitted by the base station 710 using the RNTI of the interferer cellular terminal 730 detected through blind detection to acquire the interference signal information.

As shown in FIG. 7A, the interference signal information may be acquired by demodulating PDCCH in a previous subframe (4 frames before in LTE) carrying the uplink grant (uplink resource allocation information) of the corresponding frame when the cellular uplink signal 735 causes interference to the D2D terminal 720.

As shown in FIG. 7B, when the cellular downlink signal 745 causes interference to the D2D communication, the cellular interference signal information may be acquired by demodulating PDCCH of the corresponding subframe.

According to the above procedure, the D2D terminal 720 is capable of removing the cellular interference signal component using the information acquired by demodulating PDCCH.

The above procedure is described with reference to operation S440 of FIG. 4.

Referring back to FIG. 4, the base station first acquires the information necessary for use in cellular downlink or uplink interference signal cancellation at the D2D terminal at operation S410.

The D2D terminal may detect the RNTI of the interferer cellular terminal through blind detection at operation S440. In this case, the D2D terminal performs Cyclic Redundancy Check with PDCCH demodulation for all possible cases to determine the valid case as successful blind detection.

The D2D terminal receives PDCCH addressed to the interferer cellular terminal based on the interferer terminal identifier detected through the blind detection. The D2D terminal performs demodulation and decoding on the received PDCCH in operation S470. The D2D terminal acquires the uplink interference signal information based on the PDCCH demodulation result.

The D2D terminal removes the cellular downlink or uplink interference signal or performs joint detection at operation S480.

The D2D terminal detects and decodes the desired D2D signal at operation S490.

Figure 8A:
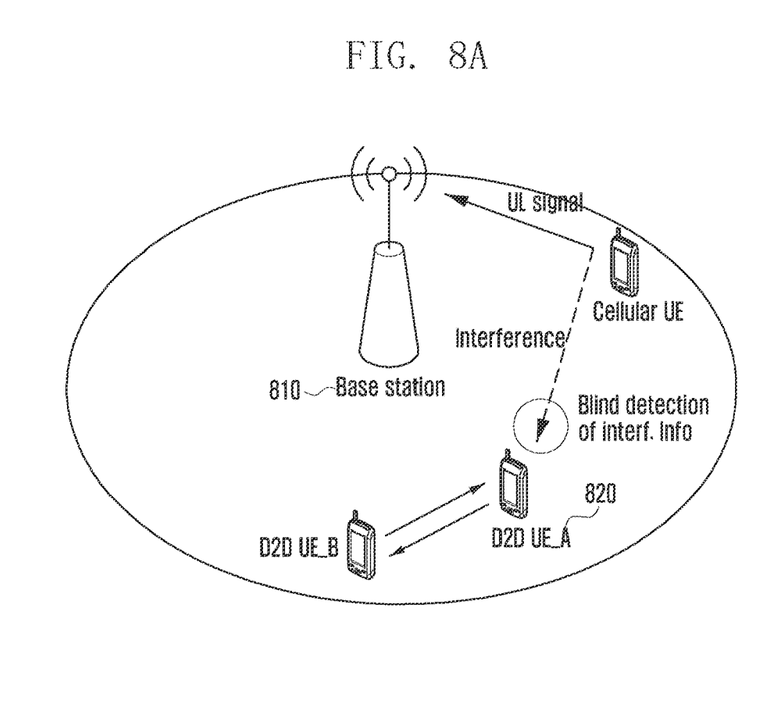
FIGS. 8A and 8B are diagrams illustrating a case where a D2D terminal acquires interference signal information through blind detection according to an embodiment of the present disclosure.
Figure 8B:
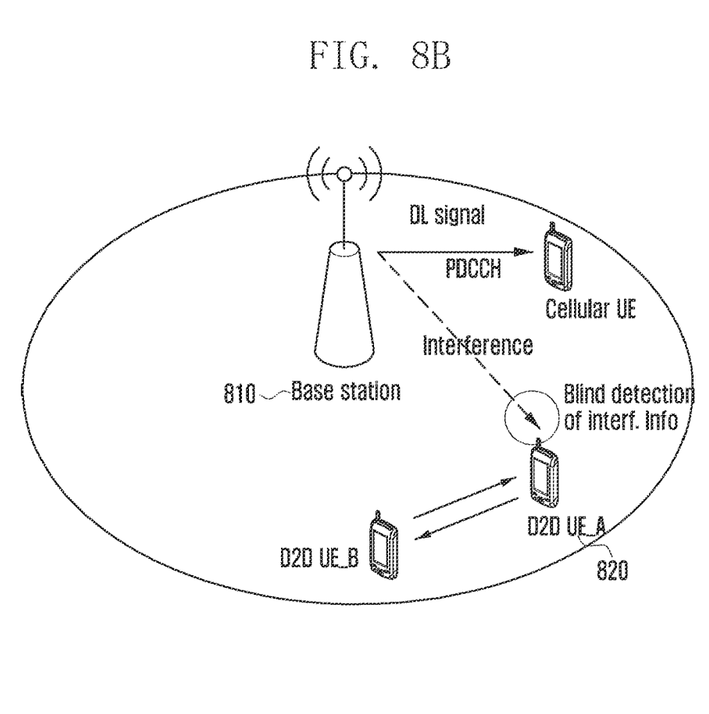

FIGS. 8A and 8B are diagrams illustrating a case where a D2D terminal acquires interference signal information through blind detection according to an embodiment of the present disclosure.

Referring to FIGS. 8A and 8B, the D2D terminal is capable of performing blind detection to acquire the information on the cellular interference signal. The D2D terminal 820 may detect the cellular downlink or uplink signal acting as interference to the D2D communication blindly according to the D2D uplink downlink transmission structures.

Then the D2D terminal 820 may remove the cellular interference signal component based on the information acquired through the blind detection.

The above procedure is described with reference to operation S450 FIG. 4.

Referring back to FIG. 4, the base station 810 first acquires the information necessary for use in cellular downlink or uplink interference signal cancellation at the D2D terminal at operation S410.

The D2D terminal acquires interference signal information through blind detection at operation S450. The D2D terminal performs blind detection to acquire the information on the cellular uplink or downlink single acting as interference to the D2D communication according to the D2D downlink or uplink transmission structure.

The D2D terminal removes the cellular downlink or uplink interference signal or performs joint detection at operation S480.

The D2D terminal detects and decodes the desired D2D signal at operation S490.

Figure 9:
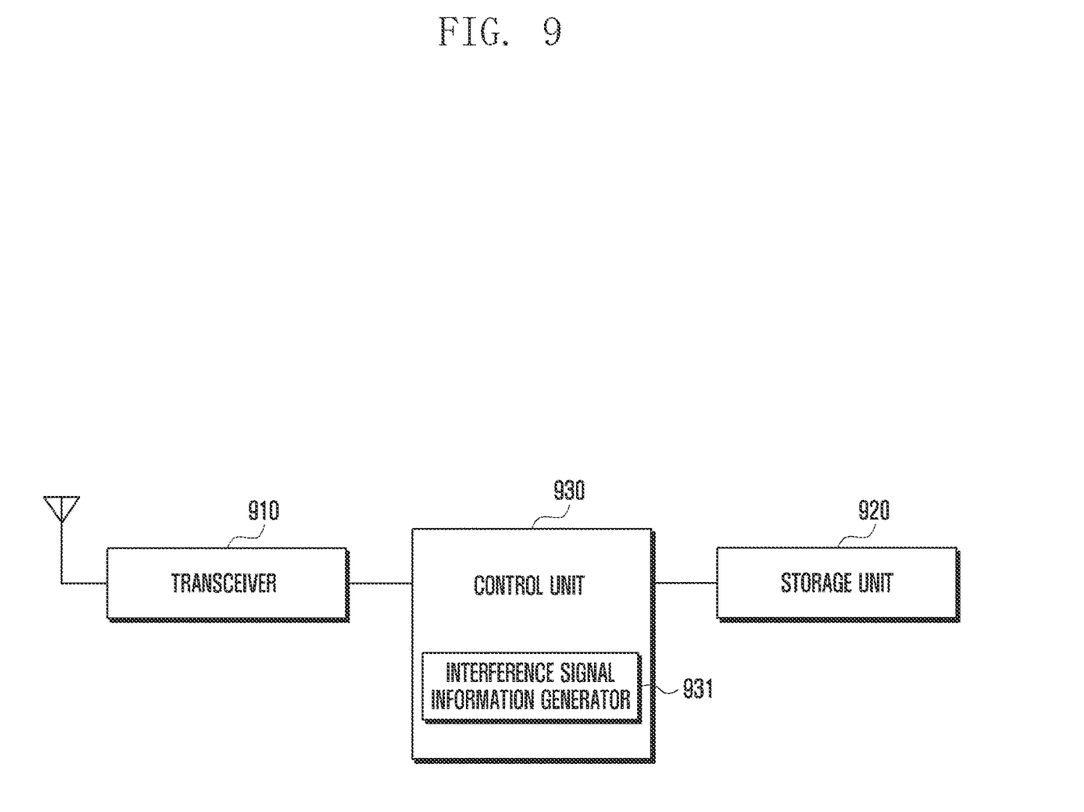
FIG. 9 is a block diagram illustrating a configuration of a base station according to an embodiment of the present disclosure.

FIG. 9 is a block diagram illustrating a configuration of a base station according to an embodiment of the present disclosure.

Referring to FIG. 9, the base station includes a transceiver 910, a storage unit 920, and a control unit 930.

The transceiver 910 is responsible for data communication of the base station. The transceiver 910 may include a Radio Frequency (RF) transmitter for up-converting and amplifying the transmission signal and an RF receiver for low noise amplifying and down-converting the received signal. The transceiver 910 transfers the received signal to the control unit 930 and transmits the data output by the control unit 930 through the radio channel. According to an embodiment of the present disclosure, the transceiver 910 may transmit the interference signal information for use in cellular interference signal cancellation to the D2D terminal.

The storage unit 920 stores programs and data concerning the operation of the base station and may include a program region and a data region.

The control unit 930 controls the signal flows among the components of the base station. In an embodiment of the present disclosure, the control unit 930 is capable of checking the cellular terminal causing interference to the D2D terminal. The control unit 930 may control the base station to generate the interference signal information for use in removing the cellular communication signal acting as interference and transmit the interference signal information to the D2D terminal. In order to accomplish this, the control unit 930 includes an interference signal generator 931.

The interference signal generator 931 may generate the interference signal information for use in cancelling cellular interference signal to the D2D terminal according to various embodiments of the present disclosure. According to an embodiment of the present disclosure, the interference signal information may include at least one of cellular interference signal resource allocation information, modulation order, and transmission mode. The D2D terminal is capable of checking the cellular interference signal based on the interference signal information and acquiring the desired signal.

According to another embodiment of the present disclosure, the interference signal information may include the identifier of the cellular terminal incurring interference to the D2D terminal. The D2D terminal demodulates PDCCH addressed to the cellular terminal based on the identifier of the cellular terminal to use the demodulation result for interference cancellation.

Figure 10:
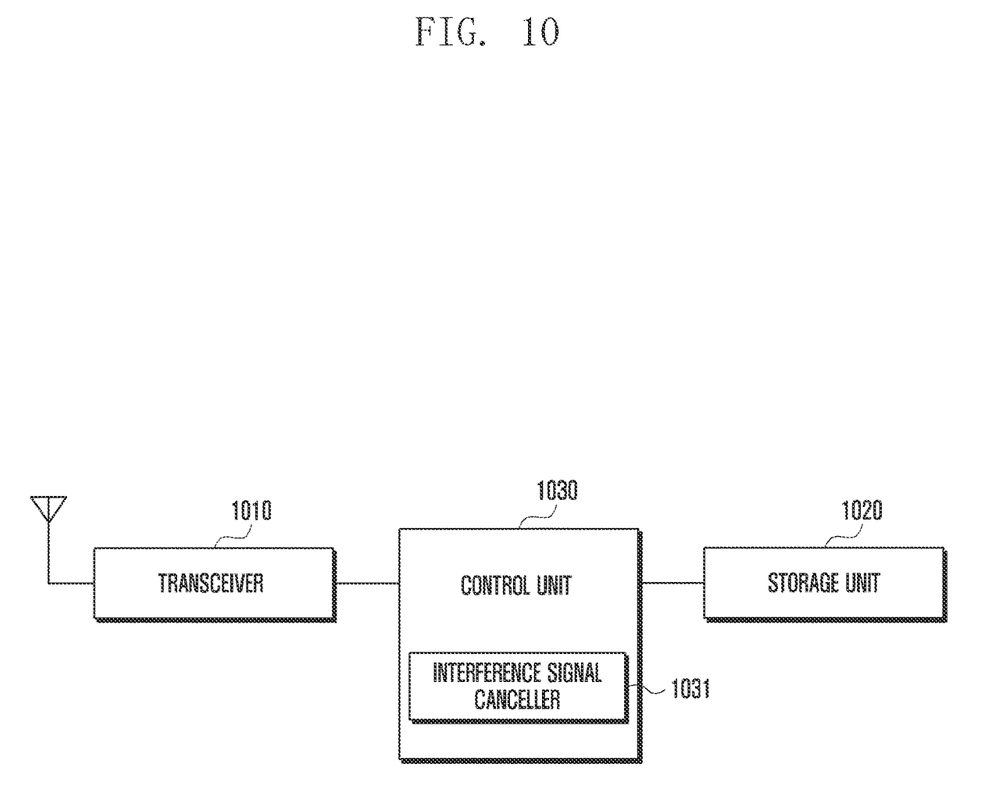
FIG. 10 is a block diagram illustrating a configuration of a D2D terminal according to an embodiment of the present disclosure.

FIG. 10 is a block diagram illustrating a configuration of a D2D terminal according to an embodiment of the present disclosure.

Referring to FIG. 10, the terminal includes a transceiver 1010, a storage unit 1020, and a control unit 1030.

The transceiver 1010 is responsible for data communication function of the D2D terminal. The transceiver 1010 may include a RF transmitter for up-converting and amplifying the transmission signal and an RF receiver for low noise amplifying and down-converting the received signal. The transceiver 1010 transfers the received signal to the control unit 1030 and transmits the data output by the control unit 1030 through the radio channel.

The storage unit 1020 stores programs and data concerning the operation of the base station and may include a program region and a data region.

The control unit 1030 controls the signal flows among the components of the D2D terminal. The control unit 1030 controls the operation of receiving the interference signal information for use in cancelling the cellular signal acting as interference to the D2D terminal and removing the cellular interference signal from the received signal based on the interference signal information. The control unit 1030 may control the terminal to process the D2D communication signal. In order to accomplish this, the control unit 1030 includes an interference signal canceller 1031.

The interference signal canceller 1031 is capable of removing the cellular interference signal from the received signal based on the interference signal information received from the base station. According to an embodiment of the present disclosure, the interference signal information may include at least one of cellular interference signal resource allocation information, modulation order, and transmission mode. The interference signal canceller 1031 detects the cellular interference signal based on the interference signal information and acquires the desired signal by removing the cellular interference signal.

According to another embodiment of the present disclosure, the interference signal information may include the identifier of the cellular terminal incurring interference to the D2D terminal. The interference signal canceller 1031 demodulates PDCCH addressed to the cellular terminal using the identifier of the cellular terminal to remove the cellular signal interference.

According to an embodiment of the present disclosure, the interference signal canceller 1031 is capable of decoding the identifier of the cellular terminal incurring interference to the D2D device blindly. The interference canceller 1031 performs CRC with PDCCH demodulation for all possible cases to determine the valid case as successful blind detection. The interference signal canceller 1031 is also capable of demodulating PDCCH addressed to the cellular terminal which is acquired based on the blind decoding. The interference signal canceller 1031 is also capable of checking the cellular interference signal based on the demodulated PDCCH and removing the cellular interference signal from the received signal.

According to another embodiment of the present disclosure, the interference signal canceller 1031 may acquire the information on the cellular interference signal blindly. The interference signal canceller 1031 may detect the cellular downlink or uplink signal acting as interference in the D2D communication downlink or uplink transmission structure blindly.

Although the description is directed that the control unit and other function blocks are responsible for performing independent functions in the above-structured base station and D2D terminal, embodiments of the present disclosure are not limited thereto. For example, the function of the interference signal canceller 1031 may be integrated into the control unit 1030.

The interference cancellation method and apparatus of the present disclosure is capable of cancelling the cellular signal acting as interference to D2D communication efficiently, thereby improving radio resource utilization efficiency in the cellular network supporting D2D communication.

As described above, the interference cancellation method and apparatus of the present disclosure is capable of cancelling cellular communication signal acting as interference to D2D communication efficiently and thus improving efficiency of radio resource utilization of the cellular network for D2D communication. Also, the interference cancellation method and apparatus of the present disclosure is advantageous in securing Internet Protocol (IP) address necessary for interference cancellation of terminal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a device-to-device (D2D) terminal in a wireless communication system, the method comprising:
   receiving, from a base station, interference signal information including a radio network temporary identifier (RNTI) of a cellular terminal identified by the base station for cancelling a cellular interference signal corresponding to the cellular terminal;
   demodulating physical downlink control channel (PDCCH) corresponding to the cellular terminal based on the RNTI of the cellular terminal;
   obtaining information including a modulation order, a transmission mode and a power offset between data and reference signals of the cellular terminal from the demodulated PDCCH;
   determining the cellular interference signal based on the modulation order, the transmission mode and the power offset between data and reference signals of the cellular terminal;
   receiving a D2D signal from a second D2D terminal; and
   cancelling the determined cellular interference signal from the received D2D signal,
   wherein the base station serves both the cellular terminal and the D2D terminal.

2. The method of claim 1, wherein the interference signal information is received through higher layer signaling.

3. The method of claim 1, wherein the receiving of the interference signal information includes detecting the interference signal information based on a blind detection.

4. A method of a base station in a wireless communication system, the method comprising:
   identifying, by the base station, a cellular terminal causing interference to a device-to-device (D2D) terminal;
   generating interference signal information for cancelling a cellular interference signal corresponding to the cellular terminal;
   transmitting, to the D2D terminal, the interference signal information including a radio network temporary identifier (RTNI) of the cellular terminal; and
   transmitting and receiving a data with the cellular terminal when the D2D terminal performs the D2D communication,
   wherein the cellular terminal and the D2D terminal are served by the base station,
   wherein the RNTI of the cellular terminal is used for demodulating physical downlink control channel (PDCCH) corresponding to the cellular terminal,
   wherein information including a modulation order, a transmission mode and a power offset between data and reference signals of the cellular terminal is obtained from the demodulated PDCCH,
   wherein the cellular interference signal is determined based on the modulation order, the transmission mode and the power offset between data and reference signals of the cellular terminal, and
   wherein the determined cellular interference signal is cancelled from a received D2D signal by the D2D terminal.

5. The method of claim 4, wherein the interference signal information is transmitted through higher layer signaling.

6. A terminal operating in Device-to-Device (D2D) communication mode in a wireless communication system, the terminal comprising:
   a transceiver configured to transmit and receive a signal; and
   at least one processor configured to:
      control the transceiver to receive, from a base station, interference signal information including a radio network temporary identifier (RNTI) of a cellular terminal identified by the base station for cancelling a cellular interference signal corresponding to the cellular terminal,
      demodulate physical downlink control channel (PDCCH) corresponding to the cellular terminal based on the RNTI of the cellular terminal,
      obtain information including a modulation order, a transmission mode and a power offset between data and reference signals of the cellular terminal from the demodulated PDCCH,
      determine the cellular interference signal based on the modulation order, the transmission mode and the power offset between data and reference signals of the cellular terminal,
      control the transceiver to receive a D2D signal from a second D2D terminal, and
      cancel the determined cellular interference signal from the received D2D signal,
   wherein the base station serves both the cellular terminal and the D2D terminal.

7. The terminal of claim 6, wherein the interference signal information is received through higher layer signaling.

8. The terminal of claim 6, wherein the interference signal information is received based on a blind detection.

9. A base station configured to control interference in a wireless communication system, the base station comprising:
- a transceiver configured to transmit and receive a signal; and
- at least one processor configured to:
  - identify a cellular terminal causing interference to a device-to-device (D2D) terminal,
  - generate interference signal information for use in cancelling a cellular interference signal corresponding to the cellular terminal,
  - control the transceiver to transmit, to the D2D terminal, the interference signal information including a radio network temporary identifier (RNTI) of the cellular terminal, and
  - control the transceiver to transmit and receive a data with the cellular terminal when the D2D terminal performs the D2D communication,
- wherein the cellular terminal and the D2D terminal are served by the base station,
- wherein the RNTI of the cellular terminal is used for demodulating PDCCH corresponding to the cellular terminal,
- wherein information including a modulation order, a transmission mode and a power offset between data and reference signals of the cellular terminal is obtained from the demodulated PDCCH,
- wherein the cellular interference signal is determined based on the modulation order, the transmission mode and the power offset between data and reference signals of the cellular terminal, and
- wherein the determined cellular interference signal is cancelled from a received D2D signal by the D2D terminal.

10. The base station of claim 9, wherein the interference signal information is transmitted through higher layer signaling.

* * * * *